(12) United States Patent
Oguma et al.

(10) Patent No.: US 10,379,794 B2
(45) Date of Patent: Aug. 13, 2019

(54) INFORMATION PROCESSING APPARATUS AND IMAGE PROCESSING METHOD FOR PERFORMING MAINTENANCE MANAGEMENT OF IMAGE FORMING APPARATUSES

(71) Applicant: KYOCERA Document Solutions Inc., Osaka (JP)

(72) Inventors: Takashi Oguma, Osaka (JP); Masato Hirota, Osaka (JP); Toru Yasui, Osaka (JP); Toshitsugu Nishimi, Osaka (JP); Chikara Yuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/147,017

(22) Filed: Sep. 28, 2018

(65) Prior Publication Data
US 2019/0129663 A1 May 2, 2019

(30) Foreign Application Priority Data

Oct. 26, 2017 (JP) ................................. 2017-207271

(51) Int. Cl.
*G06F 3/12* (2006.01)
(52) U.S. Cl.
CPC .......... *G06F 3/1229* (2013.01); *G06F 3/1204* (2013.01); *G06F 3/1288* (2013.01)

(58) Field of Classification Search
CPC combination set(s) only.
See application file for complete search history.

(56) References Cited

U.S. PATENT DOCUMENTS

| | | | | |
|---|---|---|---|---|
| 2014/0095629 A1* | 4/2014 | Brown | ............... | G06Q 10/1093 709/206 |
| 2016/0019529 A1* | 1/2016 | Wang | ................. | G06K 9/00442 705/41 |
| 2018/0350455 A1* | 12/2018 | Rosen | .................... | G16H 10/60 |

FOREIGN PATENT DOCUMENTS

JP          2016-099806 A          5/2016

* cited by examiner

*Primary Examiner* — Helen Zong
(74) *Attorney, Agent, or Firm* — Hawaii Patent Services; Nathaniel K. Fedde; Kenton N. Fedde

(57) ABSTRACT

Provided is an information processing apparatus capable of appropriately deleting a user that does not consent to policy or the like. A user-notifying unit performs a notification for requiring consent from a user registered in a user DB. A response-acquiring unit acquires response information of the user. A re-notification-transmitting unit, when consent response information is not acquired, separately transmits a re-notification to the user. The re-notification includes transmission information for transmitting consent or non-consent re-response information. A re-response-acquiring unit acquires the re-response information corresponding to the transmission information in the re-notification. A user-deleting unit deletes the user from the user DB when the re-response information is not consent.

3 Claims, 7 Drawing Sheets toMove. User (DELETED)

View by:

| | Name<br>template name | Notification<br>subtype |
|---|---|---|
| ⊘ | PaperJam<br>Default template | Event<br>Paper jam |
| ⊘ | Notification_Log<br>Default template | Event<br>Paper jam |
| ⊘ | Test<br>Default template | Event<br>Paper jam |
| ⊘ | PageCountNotifier<br>Default template | Page count<br>Black & white total |
| ⊘ | PaperJamNotifier<br>Default template | Event<br>Paper jam |
| ⊘ | notification_test | Toner level alert |

INFORMATION PROCESSING APPARATUS AND IMAGE PROCESSING METHOD FOR PERFORMING MAINTENANCE MANAGEMENT OF IMAGE FORMING APPARATUSES

INCORPORATION BY REFERENCE

This application is based on and claims the benefit of priority from Japanese Patent Application No. 2017-207271 filed on Oct. 26, 2017, the contents of which are hereby incorporated by reference.

BACKGROUND

The present disclosure relates to an information processing apparatus and information processing method, and more particularly to an information processing apparatus and information processing method that perform maintenance management of image forming apparatuses.

Conventionally, there are image forming apparatuses such as multifunctional peripherals (MFP) or the like that are capable of printing text or images.

In addition, there are also image forming systems that include a server for performing maintenance management of these image forming apparatuses.

Typically, as an example of a server of an image forming system there is a license management server that is able to easily manage licenses for maintenance management of many image forming apparatuses at customer sites. This kind of license management server includes a license-management DB, a group-management DB, a delegation-group-recognizing unit, and a license-management unit. A license-management DB stores information related to licenses for performing remote maintenance and the like of one or more image forming apparatus installed at customer sites. A group-management DB stores information related to delegation groups that represent organizations with which contracts are made for determining license contents, and normal groups to which one or more image forming apparatus belong. A delegation-group-recognizing unit extracts a delegation group from the group-management DB. A license-management unit gives license to an extracted delegation group.

On the other hand, in recent years, from the aspect of utilizing big data and the like, updating and the like of privacy policy for handling user data is becoming necessary.

Normally, in the case of updating privacy policy in this way, it has been necessary to require consent from each user. Moreover, depending on the country or region, users who refuse to give this consent have been asked to accept the right to delete user data itself from a system.

SUMMARY

The information processing apparatus according to the present disclosure includes a user-notifying unit, a response-acquiring unit, a re-notification-transmitting unit, a re-response-acquiring unit, and a user-deleting unit. The user-notifying unit performs a notification for requiring consent from a user registered in a database. The response-acquiring unit acquires response information of the user to the notification performed by the user-notifying unit. The re-notification-transmitting unit, when consent response information is not acquired by the response-acquiring unit, separately transmits a re-notification to the user that includes transmission information for transmitting consent or non-consent re-response information. The re-response-acquiring unit acquires the re-response information corresponding to the transmission information in the re-notification transmitted by the re-notification-transmitting unit. The user-deleting unit deletes the user from the database when the re-response information acquired by the re-response-acquiring unit is not consent.

The information processing method according to the present disclosure is an information processing method that is executed by an information processing apparatus. The information processing apparatus performs a notification for requiring consent from a user registered in a database. Then, the information processing apparatus acquires response information of the user to the notification. When consent response information is not acquired, the information processing apparatus separately transmits a re-notification to the user that includes transmission information for transmitting consent or non-consent re-response information. Then the information processing apparatus acquires re-response information corresponding to the transmission information in the transmitted re-notification. When the acquired re-response information is not consent, the information processing apparatus deletes the user from the database.

BRIEF DESCRIPTION OF THE DRAWINGS

FIG. 7 is a concept diagram of various kinds of subsequent notifications to a deleted user illustrated in FIG. 4.

DETAILED DESCRIPTION

Embodiments

[System Configuration of Image Forming System X]

Figure 1:
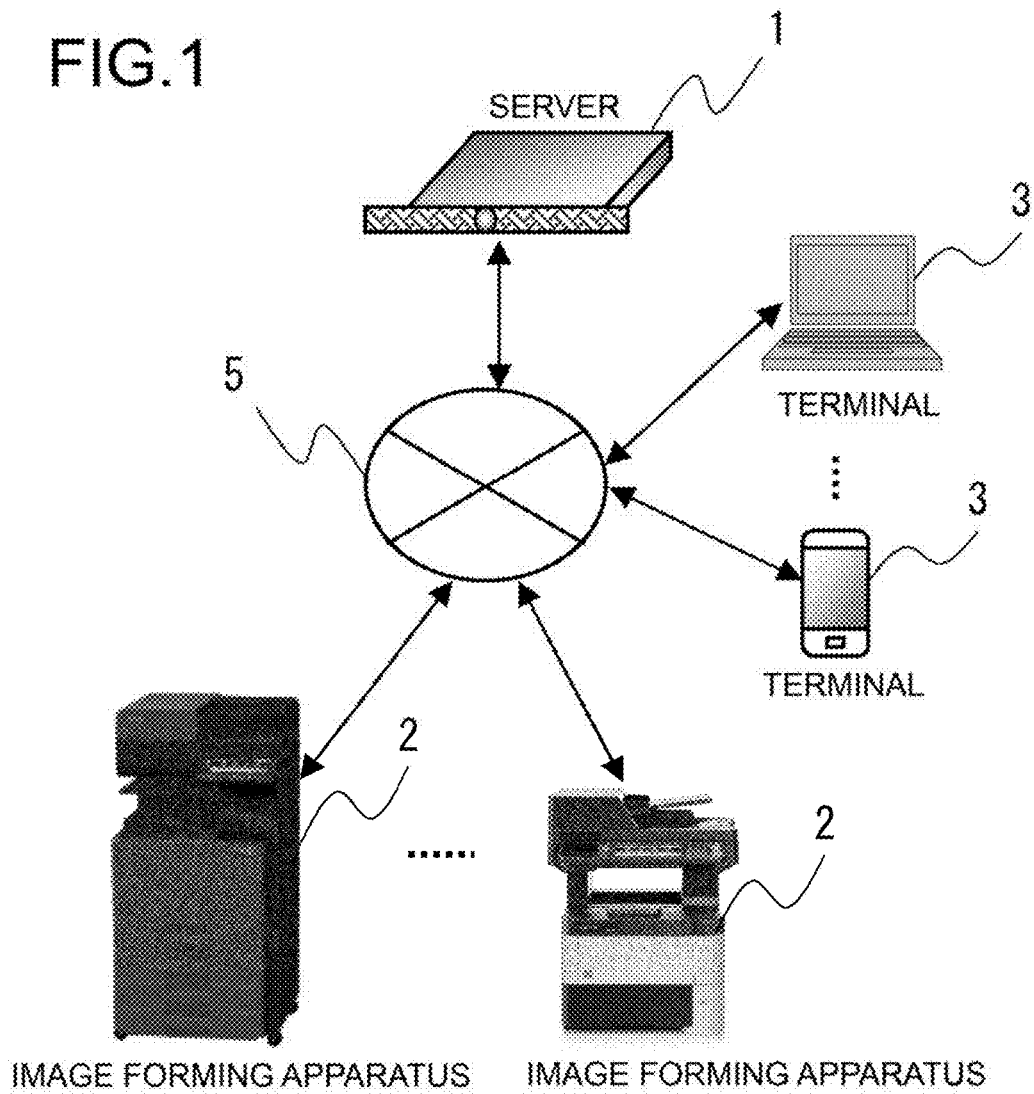
FIG. 1 is a system configuration diagram of an image forming system according to an embodiment disclosed in the present disclosure.

First, the system configuration of an image forming system X according to an embodiment disclosed in the present disclosure will be explained with reference to FIG. 1.

Image forming system X includes a plurality of image forming apparatuses 2 installed in a customer environment and terminals 3 for management that are connected to a server 1 that performs remote management via a network 5.

The server 1 is an information processing apparatus such as a personal computer (PC), general-purpose machine, or the like. The server 1 remotely manages each of the image forming apparatuses 2, and mainly performs billing, maintenance, service support. The server 1 may be a server on a so-called "cloud". Therefore, the server 1 may include a world wide web (WWW) server or the like and provide a dedicated management screen by a common gateway interface (CGI), ASP or the like to an administrator that accesses the server 1 from a terminal 3. Incidentally, the server 1 is capable of providing this management screen as screen information for dedicated application software (hereinafter, simply referred to as an "application") installed on a terminal 3.

Moreover, in this embodiment, the server 1 includes a service (service, daemon) for performing transmission or reception of e-mail or various messengers (hereinafter, simply referred to as "mail") for notifying a customer.

Incidentally, the server 1 may execute image processing, optical character recognition (OCR) processing, classification processing, and transmission processing to e-mail or shared folders (document boxes, storage folders) or to a document management system (DMS) and the like for business or office use.

In addition, the server 1 may be a server in an intranet.

An image forming apparatus 2 is a document apparatus such as an MFP, a network scanner, a document scanner, a network FAX, a printer with a scanner function, and the like. In addition, the image forming apparatus 2 may be capable of executing a maintenance management application.

Moreover, the image forming apparatus 2 may include various functions such as color or monochrome printing, facsimile transmission/reception, network facsimile transmission/reception, copying, electronic documentation by scanning, network scanning, document box for storing electronic documents, and the like. Furthermore, in the case where the image forming apparatus 2 is an MFP, printer or the like having a printing function, the image forming apparatus 2 includes a photosensitive drum, an exposing unit, a developing unit, a transferring unit, a fixing unit, and the like. As a result, the image forming apparatus 2, by executing an image forming process that includes charging, exposing, transferring and fixing, is able to record and print a toner image on recording paper.

The terminal 3 is a terminal such as a PC, smartphone, personal data assistant (PDA), mobile telephone, or the like that is used by a user. The terminal 3 operates various general-purpose operating systems (OS).

In addition, the terminal 3 may be capable of installing applications. The applications may include dedicated applications for managing image forming apparatuses 2, applications for transmitting and receiving mail, applications such as a WWW browser or the like for accessing a management screen, and the like.

Moreover, the terminal 3, by using these applications, is able to receive notifications for requiring consent (hereinafter, referred to as a "consent request notification") for updating and the like of privacy policy by the server 1, and transmit responses or re-responses to the server 1 from a user.

Furthermore, the terminal 3, via a dedicated application, mail, browser, or the like, is capable of receiving various notifications regarding status of an image forming apparatus 2 in a customer environment such as billing, usage, trouble, maintenance, and the like. The various notifications may be a display of a list, form, dialog box or the like that is displayed on the management screen of the server 1, may be a report such as a sentence(s) and the like summarizing various information, may be a push notification by mail or a dedicated application, or the like.

Moreover, using a graphical interface (GUI) by a dedicated application, browser or the like of the terminal 3, a user is able to browse information such as various notifications, billing, usage, trouble, maintenance and the like of an image forming apparatus 2 from the management screen of the server 1. In addition, as will be explained below, depending on the user's authority or the like, the user may also change various settings from the management screen of the server 1.

Here, in the image forming system X of this embodiment, each user belongs to a group such as a company, organization or the like of a customer. On this basis, in the image forming system X, each user is classified and managed in a hierarchical manner in roles such as "manager", "service person", "general customer" and the like according to the authority of the user as a customer.

Of these, the manager manages other users in the customer group. In addition, the manager, from the management screen, may change settings for information such as billing, usage, trouble, maintenance and the like of the image forming apparatuses 2, and the like. Moreover, the manager may be capable of deleting, creating, changing settings, and the like of users in a group that the manager is included in. Furthermore, the manager, from the terminal 3, is able to manage settings such as notifications and the like, including himself/herself. In this way, the manager is the user having the highest authority in a group.

In addition, the service person is a user such as a person in charge of managing maintenance of the image forming apparatuses 2, or the like in a customer group. The service person may be user in the higher hierarchy having relatively high authority for performing various management and the like from the terminal 3 under the manager.

Moreover, general customers are other users of a typical customer. A general customer may be able to browse various kinds of information mainly from the management screen on the terminal 3, and receive various notifications by e-mail or the like. However, a general customer may not be able to perform settings, make changes or the like. In other words, a general customer may be a user in the lower hierarchy having low authority.

Incidentally, apart from the classifications (roles) of users in this group, there may separately be an administrator or the like on the system side of the image forming system X.

The network 5 is an Intranet such as a local area network (LAN) and the like, or a wide area network (WAN) and the like such as the Internet, mobile telephone network, or the like.

The server 1 and each of the image forming apparatuses 2 may be connected to the network 5 via a router, gateway, or the like. Moreover, the network 5 may constitute a virtual private network (VPN).

Figure 2:
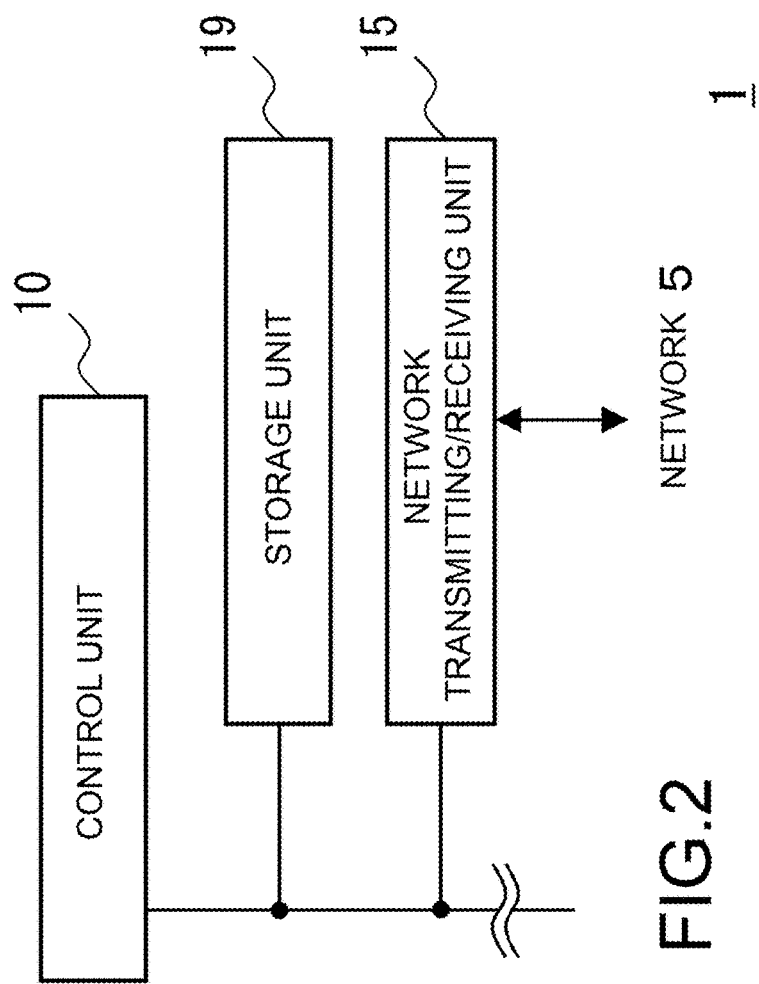
FIG. 2 is a block diagram illustrating control configuration of a server illustrated in FIG. 1.

Next, the configuration of the server 1 will be explained using FIG. 2.

The server 1 includes a control unit 10, a network-transmitting/receiving unit 15, and a storage unit 19.

The control unit 10 is an information-processing unit such as a general purpose processor (GPP), central processing unit (CPU), micro processing unit (MPU), digital signal processor (DSP), graphics processing unit (GPU), application specific processor (ASIC), or the like.

The control unit 10, by reading a control program that is stored in a ROM, SSD or HDD of the storage unit 19, developing this control program in a RAM, and executing the control program, is operated as a function unit described later.

The network-transmitting/receiving unit 15 is a network-connecting unit that includes an LAN board, a wireless transceiver, or the like for connecting to the network 5.

The storage unit 19 is a storage unit that uses a non-transitory recording medium. The storage unit 19 may include a random access memory (RAM) as a main storage unit. In addition, the storage unit 19 may include a read only memory (ROM), a flash memory such as an embedded multi media card (eMMC), solid state drive (SSD), or the like, and a hard disk drive (HDD) or the like as auxiliary storage units. In this case, the control program for performing operation control of the server 1 may be stored in an auxiliary storage unit of the storage unit 19.

Incidentally, the control unit 10 may be internally equipped with a RAM, ROM, flash memory, or the like.

[Functional Configuration of Image Forming System X]

Figure 3:
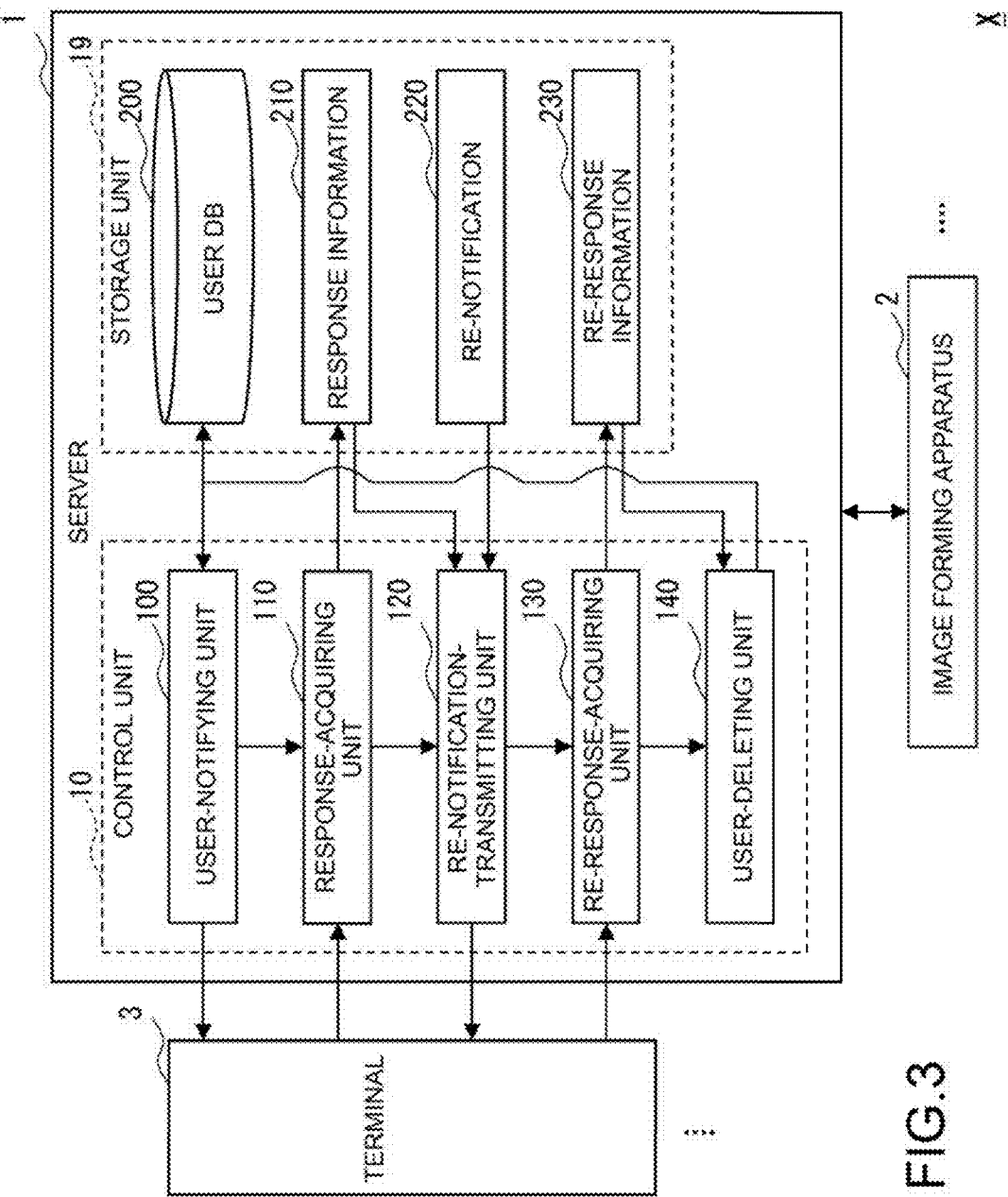
FIG. 3 is a block diagram illustrating functional configuration of an image forming system according to an embodiment disclosed in the present disclosure.

Here, referring to FIG. 3, the functional configuration of the server 1 of the image forming system X according to an embodiment disclosed in the present disclosure will mainly be explained.

The control unit 10 of the server 1, as functional units, includes a user-notifying unit 100, a response-acquiring unit 110, a re-notification-transmitting unit 120, a re-response-acquiring unit 130, and a user-deleting unit 140.

The storage unit 19 stores a user DB 200, response information 210, re-notifications 220, and re-response information 230.

The user-notifying unit 100 notifies a user registered in the user DB 200 with a consent request notification. In addition, the user-notifying unit 100 may perform this consent request notification, for example, by displaying a dialog box on a management screen that is displayed on the terminal 3. Moreover, this consent request notification may be a notification of an update of privacy policy of a user.

The response-acquiring unit 110 acquires user response information 210 for a notification performed by the user-notifying unit 100.

Moreover, the response-acquiring unit 110, for example, may acquire input data inputted to a dialog box displayed by the user-notifying unit 100 on the management screen of the terminal 3 as this response information 210.

In the case where consent response information 210 is not acquired by the response-acquiring unit 110, the re-notification-transmitting unit 120 separately transmits a re-notification 220 to the user. In addition, the re-notification-transmitting unit 120 may create a re-notification 220, and transmit the re-notification 220 separate from the notification from the user-notifying unit 100. Moreover, this re-notification 220 may include transmission information for a re-response from a user as will be described later. Furthermore, the re-notification-transmitting unit 120 may create a link that includes a URL and encoded data for accessing the server 1 as transmission information. In addition, the re-notification-transmitting unit 120 may transmit mail that includes this link as a re-notification.

The re-response-acquiring unit 130, in the re-notification 220 transmitted by the re-notification-transmitting unit 120, acquires re-response information 230 corresponding to the transmission information.

In addition, the re-response-acquiring unit 130 may acquire this re-response information 230 as the URL and encoded data for accessing the server 1. Moreover, the re-response-acquiring unit 130, at the time of the re-response to the server 1 from a browser, dedicated application or the like of the terminal 3, may cause user authentication similar to that when displaying the management screen to be executed. As a result, it becomes difficult to acquire a re-response due to misrepresentation of the user, pressing a wrong link, or the like, and it becomes possible to acquire the re-response information 230 according to the intention of the user.

The user-deleting unit 140 deletes the user from the user DB 200 when the re-response information 230 acquired by the re-response-acquiring unit 130 is not consent.

In addition, in the case where the user from which consent is to be required is the manager, the user-deleting unit 140 deletes the user after setting any one of the other users in the group as a new manager.

Moreover, in the case of setting a new manager in the group when deleting a user, the user-deleting unit 140 carries over the notification settings of the user to be deleted to the new manager.

Furthermore, in the case where a new manager is not set in the group, the user-deleting unit 140 keeps as is the notifications settings of the user to be deleted, and after that temporarily stores notifications to the user. In addition, the user deleting unit 140 notifies the manager in the group of that.

The user DB 200 is a database of users of the image forming system X.

In this embodiment, the user DB 200 may include information of settings for each user, such as a policy setting indicating whether or not there is consent of a privacy policy, or the like, a setting of a group to which a user belongs, mail address as a transmission destination for e-mail, a user ID as a user ID (identification), a user name, a classification (role) in a group according to authority, and the like. In addition, the user DB 200 may include for each user information of a password and the like for user authentication, notification settings for various notifications, elapsed time from when a consent request notification is performed, and the like. The notification settings may include settings at to what kind of information of the information of billing, usage, trouble, maintenance and the like to perform notification of. Moreover, the notification settings may include information such as what kind of the various kinds of notifications to summarize in a report, whether to notify a specific user of billing or usage information, whether to directly contact a service person with information about trouble, maintenance, and the like. In other words, the notification settings may include different settings for each user as to what kind of notification to acquire according to the role or the like of a user, or according to a setting of a manager or the like.

The response information 210 is information that includes user responses to notifications performed by the user-notifying unit 110. The response information 210 may be input data of buttons and the like in a dialog box for a consent request notification that is displayed on the management screen of the terminal 3. In addition, the response information 210 may include consent or non-consent information.

A re-notification 220 is a notification that includes transmission information for transmitting a re-response of consent or non-consent.

Moreover, the re-notification 220 may be a mail message that is transmitted by a service of the server 1. Furthermore, transmission information may be a link inside this mail for transmitting re-response information 230 of consent or non-consent. This link may include a URL (Uniform Resource Locator) for accessing the server 1, and encoded consent or non-consent information. In addition, this link may be set so that by clicking or the like from a mail application or the like of the terminal 3, transmission to the server 1 becomes possible.

The re-response information 230 is information of a consent or non-consent re-response to a notification. The re-response information 230, for example, may be a URL and encoded consent or non-consent information that is acquired by a WW server CGI, ASP, or the like of the server 1.

Here, the control unit 10 of the server 1, by executing a control program that is stored in the storage unit 19, functions as the user-notifying unit 100, the response-acquiring unit 110, the re-response-transmitting unit 120, the re-response-acquiring unit 130, and the user-deleting unit 140.

Moreover, each of the units of the server 1 described above are hardware resources for executing the image forming method according to the present disclosure.

Incidentally, part or an arbitrary combination of the functional configuration described above may be configured as hardware using ICs, programmable logic, and the like,

[User-Response-Deleting Process by the Server 1]

Next, the user-response-deleting process by the server 1 of the image forming system X according to an embodiment disclosed in the present disclosure will be explained with reference to FIG. 4 to FIG. 7.

In the user-response-deleting process of this embodiment, a consent request notification is performed for a user registered in the user DB 200. In addition, user response information 210 in response to the notification is acquired. Here, in the case where consent response information 210 is not acquired, a re-notification 220 is separately transmitted to the user. Moreover, in the transmitted re-notification 220, re-response information 230 is acquired. Then, in the case where the acquired re-response information 230 is not consent, the user is deleted from the user DB 200.

In the user-response-deleting process of this embodiment, mainly the control unit 10 executes a program stored in the storage unit 19 by using the hardware resources in cooperation with each unit.

Figure 4:
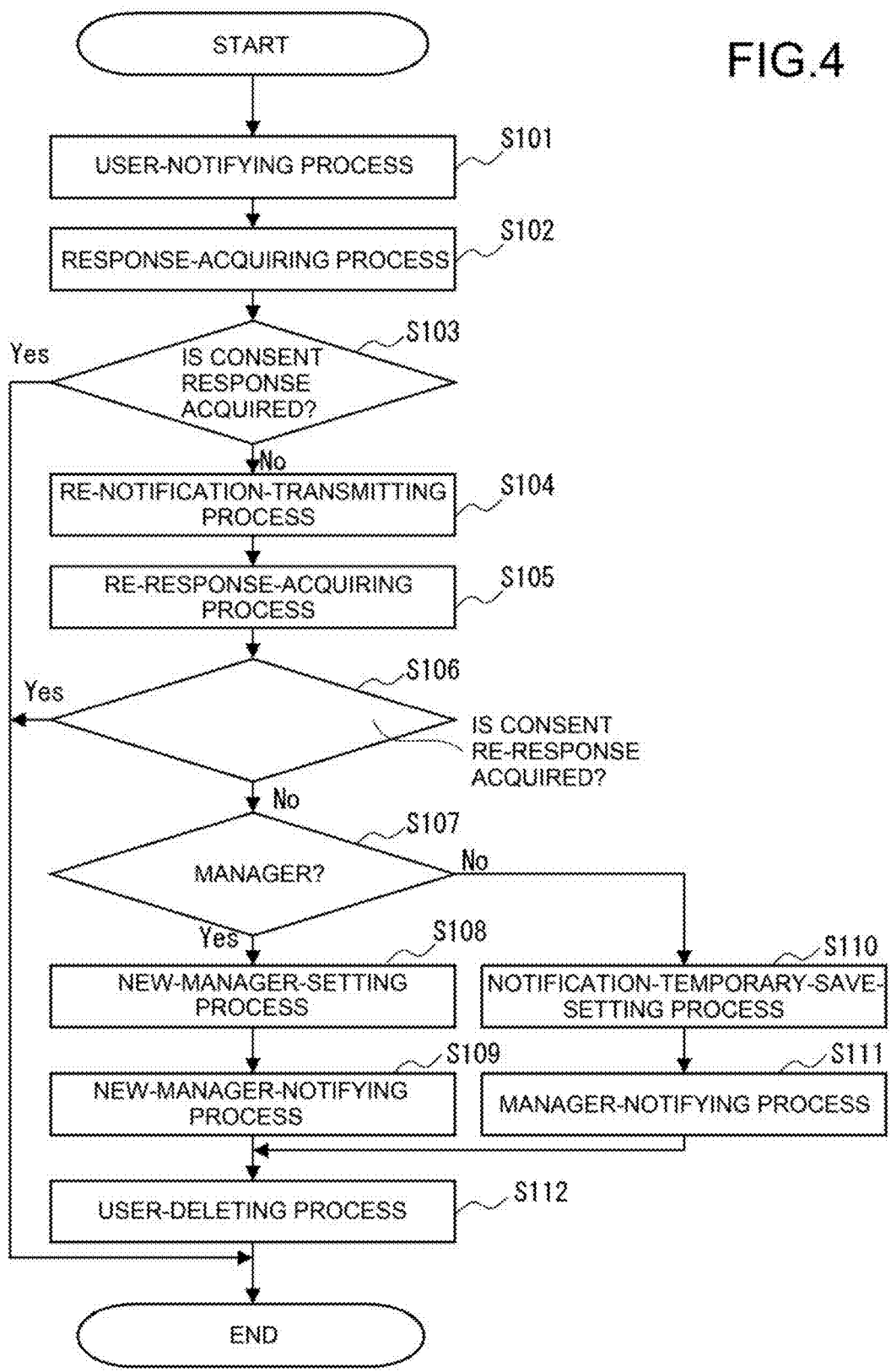
FIG. 4 is a flowchart of a user-response-deleting process according to an embodiment disclosed in the present disclosure.

In the following, each step of the user-response-deleting process will be explained in detail with reference to the flowchart in FIG. 4.

(Step S101)

First, the user-notifying unit 100 performs a user-notifying process.

The user-notifying unit 100 performs a consent request notification for a user registered in the user DB 200.

More specifically, in this embodiment, the user-notifying unit 100, for example, performs user authentication when the user, on the terminal 3, opens up the management screen of the server 1. The user-notifying unit 100 may perform user authentication by having the user input a user ID and password, or the like.

Here, in the case where it becomes necessary due to an update of privacy policy or the like to require consent from a user, the user-notifying unit 100 causes the terminal 3 to display a dialog box for this consent request notification. The user-notifying unit 100, in this dialog box, may display the privacy policy and the like and buttons indicating "consent" and "non-consent".

(Step S102)

Next, the response-acquiring unit 110 performs a response-acquiring process.

The response-acquiring unit 110 acquires user response information 210 for a notification performed by the user-notifying unit 100, and stores the response information 210 in the storage unit 19.

In the case where a button indicating "consent" or "non-consent" is pressed in the above-described dialog box, for example, the response-acquiring unit 110 acquires the result of which one is pressed as input data. That is, this input data includes consent or non-consent information.

(Step S103)

Next, the re-notification-transmitting unit 120 determines whether or not a consent response is acquired. The re-notification-transmitting unit 120 references the response information 210, and when consent information is included, determines YES. The re-notification-transmitting unit 120 determines NO for all other cases. These "other cases" include the case where non-consent information is included in the response information 210, the case where a response is rejected and the dialog box is closed, the case where a specified amount of time elapses after a response is required, and the like.

In the case of YES, the re-notification-transmitting unit 120 ends the user-response-deleting process. During this time, the re-notification-transmitting unit 120 may change the policy setting of the user DB 200 to "consent".

In the case of NO, the re-notification-transmitting unit 120 advances the process to step S104.

(Step S104)

In the case where a consent response is not acquired, the re-notification-transmitting unit 120 performs a re-notification-transmitting process.

The re-notification-transmitting unit 120 separately transmits a re-notification 220 to the user. The re-notification-transmitting unit 120, for example, references the user DB 200. In the case where the amount of elapsed time since the consent request notification is performed exceeds a specific amount of time, the notification-transmitting unit 120 creates a URL or the like, and creates mail that includes that URL or the like. This URL or the like is a URL or the like of transmission information for transmitting consent or non-consent re-response information 230. In addition, the re-notification-transmitting unit 120 transmits the created mail to the mail address of the user as re-notification information 220 for requiring a consent re-response.

(Step S105)

Next, the response-acquiring unit 110 performs a re-response-acquiring process.

The re-response-acquiring unit 130 acquires re-response information 230 corresponding to the transmission information of the re-notification 220.

More specifically, when a link or the like in mail of the re-notification 220 is pressed, the re-response-acquiring unit 130 acquires access to the server 1 from user terminal 3 by a WWW server or the like. As a result, the re-response-acquiring unit 130 acquires a URL and encoded data, and stores the result of decoding the encoded data in the storage unit 19 as re-response information 230. In addition, during this access, the re-response-acquiring unit 130 may perform user authentication by having the user input a user ID and password, or the like.

Incidentally, in the case where a re-response is not acquired within a specific period of time, the user-deleting unit 140 may notify the group manager by mail or the like. Moreover, in this case, the re-notification-transmitting unit 120 may once again create re-response mail, and transmit that mail to the user for requiring a re-response.

(Step S106)

Next, the user-deleting unit 140 determines whether or not a consent re-response is acquired. In the case where consent information is included in the re-response information 230, the user-deleting unit 140 determine YES. In the case where non-consent information is included in the re-response information 230, the user-deleting unit 140 determines NO.

In the case of YES, the user-deleting unit 140 ends the user-response-deleting process. At this time, the user-deleting unit 140 may change the policy setting of the user DB 200 to "consent".

In the case of NO, the user-deleting unit 140 advances the process to step S104. At this time, the user-deleting unit 140 may change the policy setting of the user DB 200 to "non-consent".
(Step S107)

In the case where a consent re-response is not acquired, the user-deleting unit 140 determines whether or not the non-consenting user is a manager. In the case where the user not giving a consent re-response is a manager, the user-deleting unit 140 determines YES. The user-deleting unit 140 determines NO for all other cases.

In the case of YES, the user-deleting unit 140 advances the process to step S108.

In the case of NO, the user-deleting unit 140 advances the process to step S110.
(Step S108)

In the case where the non-consenting user is a manager, the user-deleting unit 140 performs a new-manager-setting process.

The user-deleting unit 140 sets any one of the other users in the group as a new manager. In addition, at this time, the user-deleting unit 140 carries over the notification settings of the user to be deleted to the new manager, and sets those notification settings in the user DB 200.

Incidentally, in the case where the user is an individual user or the like, and there is no other user belonging to the group, the user-deleting unit 140 may notify an administrator or the like.

Figure 5:
FIG. 5 is a concept diagram of the user-response-deleting process illustrated in FIG. 4.

This process will be described in detail using the example in FIG. 5. Each table illustrated in FIG. 5 is an example illustrating part of the user DB 200. In this table, "P" indicates the state of the policy setting, "G" indicates: membership group, mail address, user ID, user name and user classification (role).

Here, element A in FIG. 5 illustrates an example in which a "non-consenting" user, for which the state of the policy setting is a triangle, belongs to group "A", the user ID of that user is "at-kdc", and the user is the manager.

According to element B in FIG. 5, in this case, the user-deleting unit 140 sets the user that has user ID "at-kdc-service", belongs to the same group "A", is a "service person" (service) and is higher in the hierarchy as the new manager. In addition, the user-deleting unit 140 sets the notification setting of the non-consenting user "at-kdc" who was the former manager to "at-kdc-service". As a result, "at-kdc-service" will acquire notifications of the same kind of information as "at-kdc".
(Step S109)

Next, the user-deleting unit 140 performs a new-manager-notifying process.

The user-deleting unit 140 notifies the newly set manager of being set as the new manager, and that the new manager is carrying over the notification settings. The user-deleting unit 140 may perform this notification by creating mail.

After that, the user deleting unit 140 advances the process to step S112.
(Step S110)

In the case where the non-consenting user is not the manager, the user-deleting unit 140 performs a notification-temporary-save-setting process.

The user-deleting unit 140 does not transmit or the like various notifications after that to the non-consenting user, and sets the user DB 200 so as to temporarily save those notifications. At this time, the user-deleting unit 140 may keep as is the notification settings of the user to be deleted.

Figure 6:
FIG. 6 is a concept diagram of the user-response-deleting process illustrated in FIG. 4.

This will be explained using the example in FIG. 6. Element A of FIG. 6 illustrates an example in which a "non-consenting" user belongs to group "A", the user ID of that user is "toMove.User", and that user is a general customer.
(Step S111)

Next, the user-deleting unit 140 performs a manager-notifying process.

The user-deleting unit 140, by mail, notifies the manager of the group to which the non-consenting user belongs that from now on notifications to the user will be temporarily stored. In the example of element A in FIG. 6, the user-deleting unit 140 transmits this mail to "at-kdc" who is the manager of the group "A".

Explaining this with reference to FIG. 7, using terminal 3, the manager is able to browse the various temporarily stored notifications for the non-consenting user that is deleted. The various notification examples 300 in FIG. 7 are examples of various notifications that are displayed on the management screen. In this example, the deleted "toMove.User" is receiving information of paper jam events, paper counts of the number of pages printed, maintenance such as low toner, and the like. The manager, by browsing the various temporarily stored notifications, is able to appropriately respond. In addition, the manager, by referencing the various temporarily stored notifications, is able to have a suitable user carry over the notifications settings.
(Step S112)

Here, the user-deleting unit 140 performs a user-deleting process.

The user-deleting unit 140 deletes the user from the user DB 200 when the re-response information 230 acquired by the re-response-acquiring unit 130 is not consent.

In the example of element B of FIG. 5, the user-deleting unit 140 deletes each data of "at-kdc" from the user DB 200. Moreover, in the example of element B of FIG. 6, the user-deleting unit 140 deletes each data of "toMove.User" from the user DB 200.

This ends the user-response-deleting process according to an embodiment disclosed in the present disclosure.

By configuration as described above, the following effects can be obtained.

Conventionally, in the above-described typical server (information processing apparatus) of an image forming system, deletion of a user by the system was not presumed. Therefore, when data of a user not consenting to privacy policy or the like is simply deleted, a problem occurs in that various notifications cannot be performed immediately.

However, the server 1 according to an embodiment disclosed in this disclosure is an information processing apparatus including: a user-notifying unit 100 that performs a notification for requiring consent from a user registered in a user DB 200; a response-acquiring unit 110 that acquires response information 210 of the user to a notification performed by the user-notifying unit 100; a re-notification-transmitting unit 120 that, when consent response information 210 is not acquired by the response-acquiring unit 110, separately transmits a re-notification 220 to the user that includes transmission information for transmitting consent or non-consent re-response information 230; a re-response-acquiring unit 130 that acquires re-response information 230 corresponding to the transmission information in the re-notification 220 transmitted by the re-notification-transmitting unit 120; and a user-deleting unit 140 that deletes the user from the user DB 200 when the re-response information 230 acquired by the re-response-acquiring unit 130 is not consent.

With this kind of configuration, it is possible to delete a user according to the intention of the user. In addition, by separately transmitting a re-notification 220 when consent is not obtained, it is possible to delete the user after obtaining confirmation from the non-consenting user. In other words, in the case where a consent response is not obtained for a consent request notification for some reason, the possibility of obtaining consent the next time increases. Moreover, by obtaining a definite non-consent re-response, it is possible to reliably prevent deleting a user by mistake.

Moreover, in the server 1 according to an embodiment disclosed in the present disclosure, the notification for requiring consent is an update notification of privacy policy of a user, and the re-notification-transmitting unit 120 separately transmits a re-notification 220 by mail that includes a link.

With this kind of configuration, it is possible for users that refuse to update the privacy policy to specifically exercise the user's "right to be deleted."

Moreover, by separately transmitting a re-notification 220 by mail that includes a link, a user, by clicking or the like on the link, can transmit whether or not to consent to this update of privacy policy to the server 1, and it is possible to reduce the work by the user.

Furthermore, in the server 1 according to an embodiment disclosed in the present disclosure, the user-deleting unit 140, when the user is a manager that manages other users in a group, deletes the user after setting any one of the other users in the group as a new manager.

With this kind of configuration, even though the manager in the group is deleted, other users in the group are able to use the image forming system X without trouble.

In addition, it is possible to select another user in the group as the new manager in an order of hierarchical role. Therefore, it is possible to avoid problems and the like due to the absence of a manager.

In addition, in the server 1 according to an embodiment disclosed in the present disclosure, the user-deleting unit 140, when setting the new manager, carries over the notification settings of the user to be deleted to the new manager, and when a new manager is not set, keeps as is the notification settings of the user to be deleted, and notifies the manager that the subsequent notifications for the user will be temporarily saved.

With this kind of configuration, it is possible to carry the notification settings of the original manager over to the new manager set in the group. As a result, in the case where specific various notifications are performed for the manager, the new manager is able to carry over and acquire the specific various notifications without requiring any particular setting or the like.

Moreover, in the case where a new manager does not need to be set in the group, or in other words, in the case where a user other than the manager is to be deleted, the manager is able to appropriately have other users carry over the various notifications of the user to be deleted. At this time, the manager is able to browse through various temporarily stored notifications, and select other users to carry over the notifications.

Incidentally, the technique as disclosed in the present disclosure may also be applied to information processing apparatuses other then a server 1 of an image forming system. In this case, the technique may be applied to an image processing apparatus that performs management of a server or the like to which a network scanner or scanner other than an image forming apparatus 2 is separately connected by a USB or the like.

Furthermore, the technique according to the present disclosure may be applied to other kinds of various image processing apparatuses that perform deletion of a user at times other than when there is an update of privacy policy of a user. In other words, the technique may applied to various situations such as where unless user gives consent, continued use is not possible and the user must be deleted from a database.

In the above-described example of a typical server of an image forming system, deleting a user is not presumed.

Taking such a situation into consideration, the object of the present disclosure is to provide an information processing apparatus that solves the above-described problems.

With the technique according to the present disclosure, a notification for requiring consent is performed for a user registered in a database and response information is acquired, however, in the case where consent response information is not acquired, a re-notification that includes transmission information for transmitting consent or non-consent re-response information is separately transmitted, and in the case where the re-response information acquired by this re-notification is not consent, the user is deleted from the database. As a result, it is possible to provide an information processing apparatus capable of appropriately deleting a user from a database according to the intention of the user.

Moreover, needless to say, the configuration and operation of the above-described embodiments are examples and can be appropriately changed and executed without departing from the gist of the present disclosure.

What is claimed is:

1. An information processing apparatus comprising:
    a user-notifying unit that performs a notification for requiring consent from a user registered in a database;
    a response-acquiring unit that acquires response information of the user to the notification performed by the user-notifying unit;
    a re-notification-transmitting unit that, when consent response information is not acquired by the response-acquiring unit, separately transmits a re-notification to the user that includes transmission information for transmitting consent or non-consent re-response information;
    a re-response-acquiring unit that acquires the re-response information corresponding to the transmission information in the re-notification transmitted by the re-notification-transmitting unit; and
    a user-deleting unit that deletes the user from the database when the re-response information acquired by the re-response-acquiring unit is not consent;
    wherein
    the user-deleting unit,
    when the user is a manager that manages other users in a group, deletes the user after setting any one of the other users in the group as a new manager;
    when setting the new manager, carries over notification settings of the user to be deleted to the new manager; and
    when a new manager is not set, keeps as-is the notification settings of the user to be deleted, and notifies the manager that subsequent notifications for the user will be temporarily saved.

2. The information processing apparatus according to claim 1, wherein
    the notification for requiring consent is an update notification of privacy policy of the user, and
    the re-notification-transmitting unit separately transmits a re-notification by mail that includes a link.

3. An information processing method that is executed by an information processing apparatus, wherein the information processing apparatus
- performs a notification for requiring consent from a user registered in a database;
- acquires response information of the user to the notification;
- when consent response information is not acquired, separately transmits a re-notification to the user that includes transmission information for transmitting consent or non-consent re-response information;
- acquires re-response information corresponding to the transmission information in the transmitted re-notification; and
- deletes the user from the database when the acquired re-response information is not consent;

wherein the information processing apparatus,
- when the user is a manager that manages other users in a group, deletes the user after setting any one of the other users in the group as a new manager;
- when setting the new manager, carries over notification settings of the user to be deleted to the new manager; and
- when a new manager is not set, keeps as-is the notification settings of the user to be deleted, and notifies the manager that subsequent notifications for the user will be temporarily saved.

* * * * *